(12) United States Patent
Hautala et al.

(10) Patent No.: US 6,182,478 B1
(45) Date of Patent: Feb. 6, 2001

(54) APPARATUS FOR CLEANING A SUSPENSION, PREFERABLY A FIBER MASS SUSPENSION

(75) Inventors: Jouko Hautala; Jukka Heimonen; Veli-Matti Rajala, all of Tampere; Ismo Hourula, Oulunsalo, all of (FI)

(73) Assignee: Valmet Corporation, Helsinki (FI)

(*) Notice: Under 35 U.S.C. 154(b), the term of this patent shall be extended for 0 days.

(21) Appl. No.: 09/524,344

(22) Filed: Mar. 13, 2000

Related U.S. Application Data

(63) Continuation of application No. PCT/FI98/00732, filed on Sep. 17, 1998.

(30) Foreign Application Priority Data

Sep. 19, 1997 (FI) ......................................................... 973736

(51) Int. Cl.$^7$ .................................................................. D21C 1/02
(52) U.S. Cl. .......................................... 68/181 R; 68/183
(58) Field of Search .................................. 68/181 R, 183; 134/102.2; 8/156

(56) References Cited

FOREIGN PATENT DOCUMENTS

| 1055168 | 5/1979 | (CA) . |
|---|---|---|
| 0 229 224 A2 | 7/1987 | (EP) . |
| 922/64 | 1/1969 | (FI) . |
| 2 291 367 | 1/1996 | (GB) . |

*Primary Examiner*—Philip R. Coe
(74) *Attorney, Agent, or Firm*—Alston & Bird LLP

(57) ABSTRACT

An apparatus for cleaning a fiber mass suspension, the apparatus comprising a receptacle and an inlet channel and an outlet channel for feeding the suspension into and for discharging it from the receptacle. In addition, the apparatus comprises air feed means for feeding air into the lower portion of the receptacle. The apparatus comprises at least one partition wall dividing the receptacle into spaces in such a way that the suspension may flow between the spaces at the lower portion and the upper portion of the partition wall, respectively. The air feeding means are positioned to feed air into one aeration space, whereby the air separates impurities from the suspension and makes the suspension flow on different sides of the partition wall upwards and downwards, respectively, so that a spiral flow is created around the partition wall from the inlet channel into the outlet channel.

7 Claims, 3 Drawing Sheets

APPARATUS FOR CLEANING A SUSPENSION, PREFERABLY A FIBER MASS SUSPENSION

CROSS-REFERENCE TO RELATED APPLICATIONS

This application is a continuation of pending PCT International Application PCT/FI98/00732, filed Sep. 17, 1998, designating inter alia the United States, which is incorporated herein by reference.

FIELD OF THE INVENTION

The invention relates to an apparatus for cleaning a suspension, preferably a fiber mass suspension.

BACKGROUND OF THE INVENTION

When processing recycling paper, extra substances, such as dirt and printing ink, must be removed from the paper in order to provide a fiber mass usable for further processing. For this purpose, so-called flotation deinking is used rather generally, whereby fiberized and, in most cases, screened fiber mass is fed with air bubbles, which rise and carry impurities upwards in such a way that these can be removed from the surface of the fiber mass suspension. In practice, one aeration is not enough for cleaning the mass, but the known solutions generally utilize several sequential receptacles and different pumping and mixing solutions, trying to expose the suspension to several processes for providing a final result as clean as possible. A problem with such solutions is that the apparatus is complicated and requires separate pumps and tube systems as well as several receptacles. An additional problem with solutions of this kind consists in operating and maintenance costs caused by additional devices.

GB Patent 2 291 367 discloses a solution, in which a suspension is fed into a circular receptacle divided into sectors by means of partition walls and there is a funnel in the middle of the receptacle, into which impurities rising onto the surface of the sectors may flow over the edge of the funnel. The suspension is fed into one sector and it moves forward from the feeding sector into the next sector through openings in the lower portion of the partition walls and finally flows out from the last sector adjacent to the feeding sector. Each sector is fed with air and comprises a separate mixing device, by which the suspension within the sector is put in circulation. In practice, this solution corresponds to several sequential aeration receptacles, even though it functions without separate pumps moving suspension from one aeration space into another. In the solution, however, air feed devices and mixing devices shall be provided for each sequential sector. Finnish Patent Application 922/64 discloses, in turn, a solution, which corresponds to said GB solution and in which suspension is moved from one sector into another by means of so-called air-lift pumps. In other respects, however, the function corresponds to the solution of the GB publication.

SUMMARY OF THE INVENTION

The object of the present invention is to provide an apparatus for cleaning a suspension, preferably a fiber mass suspension, which enables a more efficient cleaning than the known solutions and which is easy to implement. The apparatus of the invention is characterized in that the partition wall between the two spaces is formed in such a way that the spaces are in communication with each other at the lower portion of the partition wall. Accordingly, the suspension may flow from one space into the other at the upper portion of the partition wall. Means for feeding air into the suspension are arranged to feed air only into an aeration space, which is one of said two spaces being in communication with each other. The suspension flows, under the influence of the air to be fed, in the aeration space upwards and, respectively, in the space on the other side of the partition wall downwards so that a spiral flow around the partition wall between said two spaces is created. The inlet channel and the outlet channel of the suspension are positioned such that the distance between them in the propagation direction of the suspension flow is as long as possible.

An essential idea of the invention is that a suspension, such as a fiber mass suspension, is fed into a receptacle for processing comprising at least one partition wall dividing the receptacle into at least two spaces. The suspension to be cleaned may flow from one space into the other below the partition wall and over the upper edge thereof, respectively. Another essential idea of the invention is that cleaning air is fed only into one of the two spaces being in communication with each other. The suspension to be cleaned is put in circulation in a cleaning receptacle by means of air bubbles fed for removing impurities in such a way that the part of the suspension which is bound by air bubbles and contains mainly impurities rises onto the surface of the receptacle, from where it can be easily removed. The cleaner suspension moves forward in the process and turns back to the aeration stage as a result of the vertical flow so that an essentially spiral flow is created. This flow propagates from the inlet of the suspension to the outlet thereof, while the degree or purity of the suspension increases all the time.

In accordance with a preferred embodiment of the invention, the aeration receptacle is divided into sequential parts by means of spacer plates in such a way that the spacer plates extend to the bottom of the receptacle. There are openings in the lower portion of a ring-shaped partition wall around the central part of the receptacle, through which openings the mass is allowed to flow from the receptacle spaces at the outer periphery into the central part. The mass can then flow over the upper edge of the partition wall around the central part and further into the outermost receptacle spaces of the receptacle.

An advantage of the invention is that a fiber mass can be aerated effectively at the same time as air bubbles cause the fiber mass or another suspension to flow between the spaces of a cleaning receptacle. This is because, when air is fed into one of the receptacle spaces communicating with each other, the suspension therein flows upwards and, respectively, the suspension in the other receptacle flows below a partition wall into an aeration space. Simultaneously, the suspension arrives, when rising upwards in the aeration space, at the upper portion of the receptacle and moves forward over the upper edge of the partition wall together with the flow. A froth is created by means of air and containing impurities, and which is easy to remove from the surface of the fiber mass suspension either according to overflow principles or by different mechanical removing means.

Simultaneously, the rest of the fiber mass suspension can be caused to flow downwards in the other receptacle space, and consequently, a spiral flow is provided around the partition wall. In this spiral flow the degree of purity increases all the time as the spiral propagates, until the suspension is finally discharged through the outlet channel of the suspension situated at a distance as long as possible from the inlet channel of the suspension. In this way, no separate pumps or circulation devices are required for the implementation of the solution according to the invention, but the air alone fed for aeration purposes causes a circulation and a sequential cleaning in many stages.

BRIEF DESCRIPTION OF THE DRAWINGS

The invention will be described in more detail in the attached drawings, in which.

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Figure 1:
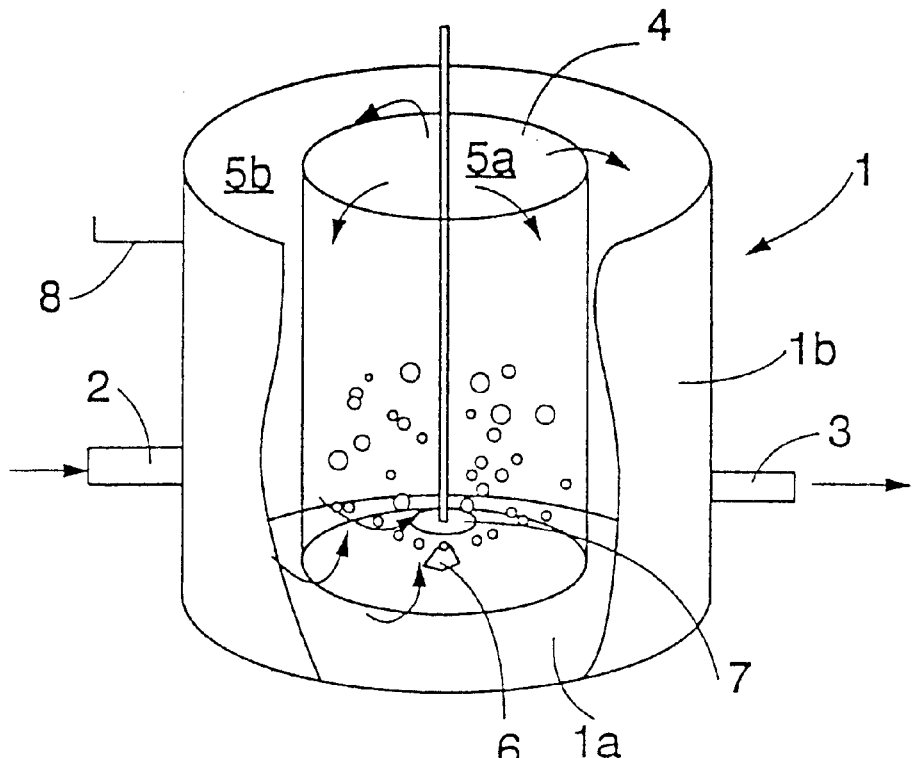
FIG. 1 shows schematically an embodiment of an apparatus of the invention partially in section.

FIG. 1 shows schematically an apparatus comprising a receptacle 1. The receptacle 1 is constituted by a bottom 1a and an outer envelope 1b. A fiber mass suspension to be cleaned is fed into the receptacle 1 through an inlet channel 2 and, respectively, the cleaned fiber mass suspension is discharged from the receptacle 1 through an outlet channel 3. It is desirable for the operation of the invention that the flow distance between the inlet channel 2 and the outlet channel 3 is as long as possible.

Inside the receptacle 1, there is a partition wall 4 dividing the interior of the receptacle 1 into two spaces 5a and 5b separate from each other. The height of the partition wall 4 is such that its lower end is situated at a distance from the bottom 1a so that the fiber mass suspension may flow below the partition wall 4 between the spaces 5a and 5b. Correspondingly, the upper end of the partition wall 4 is some distance below the upper edge of the envelope 1b of the receptacle. In the space 5a enclosed by the partition wall 4, there are one or several air feed nozzles 6, through which pressurized air is fed into the space 5a, hereafter called aeration space 5a. The embodiment of the figure shows above the air nozzle 6 a separate mixing plate 7, which is rotated in such a way that air bubbles spread as evenly as possible all over the aeration space so that the cleaning can be made as efficient as possible. The air nozzles 6 may also be shaped in some other way, they can e.g. be constituted by a grate or a net, or they can be nozzles of other kinds, by means of which air bubbles of a suitable size can be distributed as well as possible in the area of the aeration space 5a.

During operation, the fiber mass suspension is fed from the inlet channel 1 into the other outer ring-shaped space 5b. When the receptacle 1 is filled with fiber mass suspension, the air bubbles of the air to be fed into the aeration space 5a cause a reduction of the average density of the fiber mass suspension in the space including the density of the air bubbles, and then the fiber mass suspension begins to flow upwards. The air bubbles carry away printing ink and other impurities as well, which accumulate in the upper portion of the receptacle 1 and create a froth. Simultaneously, the rest of the fiber mass flows over the upper edge of the partition wall 4 into the outer space 5b of the receptacle 1 and along that further into the lower portion of the space 5b in order to return back into the aeration space 5a below the partition wall 4.

Because new fiber mass suspension all the time flows into the receptacle 1, it forces the suspension flowing from above downwards to move to the sides of the incoming suspension flow from the inlet channel 2. In this way, a spiral flow around the partition wall 4 from the space 5a into the space 5b and back is created in the manner described in FIG. 2. The fiber mass suspension is thus cleaned by the air bubbles carrying away the impurities onto the surface to create a froth. This takes place several times in a spiral flow and in such a way that, finally, the fiber mass suspension coming from the aeration space 5a into the other space 5b is rather clean and it is discharged through the outlet channel 3.

The froth with its impurities, accumulated in the upper portion of the receptacle 1, can be removed in several different ways. The froth and impurities may flow over the upper edge of the receptacle 1 into a collector receptacle 8 situated outside the receptacle 1, or they can be removed by scraping mechanically or by sucking the froth from the surface by a suitable air apparatus. As appears from FIG. 2, two spiral flows are created in this embodiment, both of them circulating around the edge of the partition wall 4 between the inlet channel and the outlet channel on both sides of the receptacle 1. Means for removing impurities can be constituted in a simple manner, such as by an overflow opening, which is arranged over the upper edge of the receptacle and which may have the breadth of the whole receptacle envelope. Alternatively, the envelope 1b of the receptacle 1 can be provided with places lower than the other edges of the envelope for directing and facilitating the overflow and overfall of impurities. Further, the means for removing impurities may be scrapers, suckers, fans or some other suitable devices, by which the froth and the impurities therein can be removed from the upper portion of the receptacle.

Figure 2:
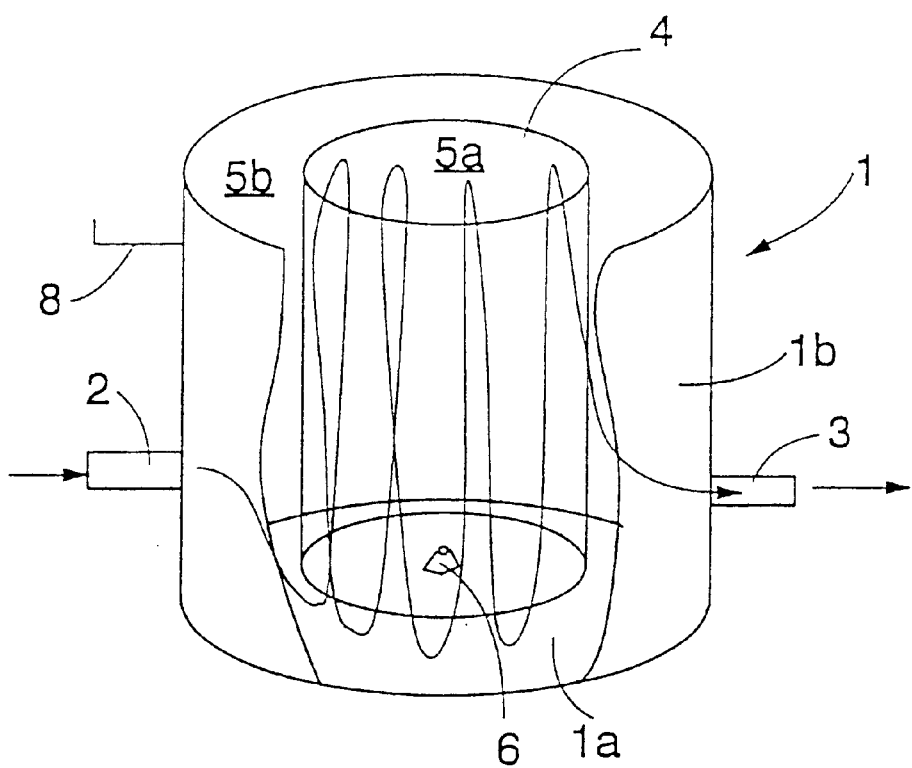
FIG. 2 shows schematically the flow of suspension in the apparatus of FIG. 1.
Figure 3:
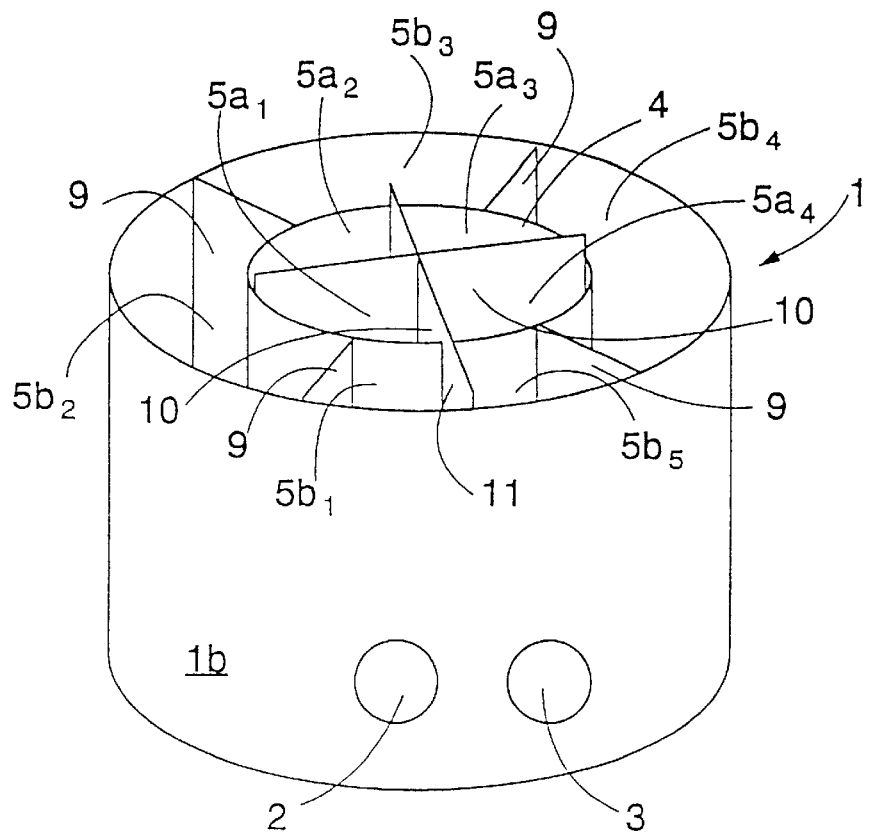
FIG. 3 shows schematically a second embodiment of the apparatus of the invention.
Figure 4:
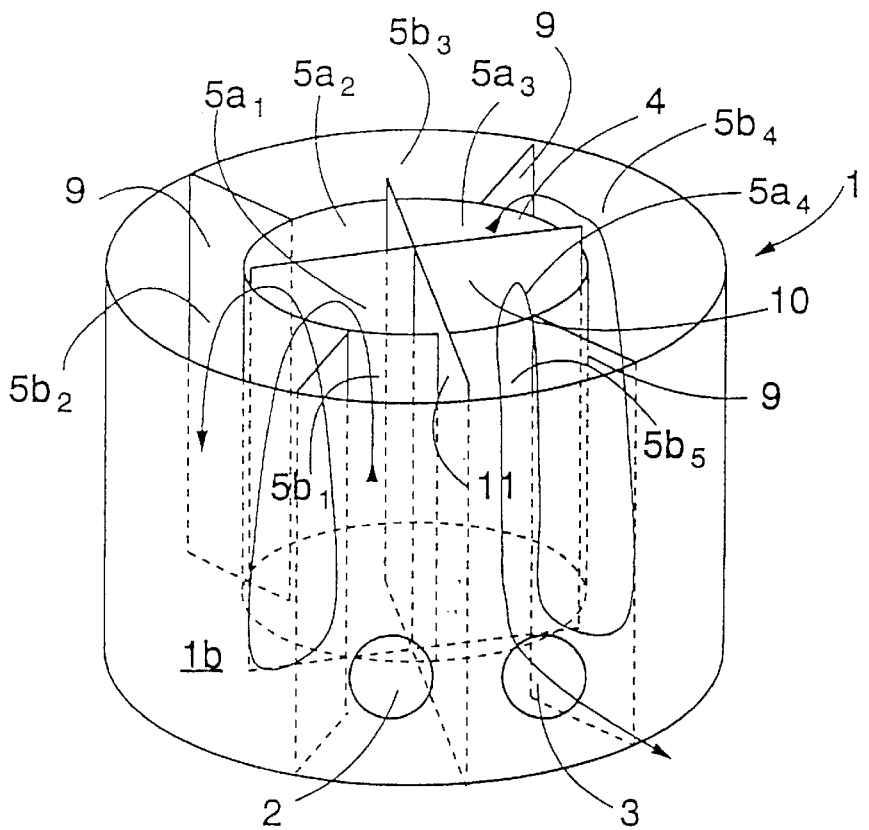
FIG. 4 shows schematically the flow of suspension in the apparatus of FIG. 3.

FIGS. 3 and 4 show schematically another apparatus according to the invention and a flow of a fiber mass suspension in said cleaning apparatus. In these figures, the same numerals as in FIGS. 1 and 2 are used for the corresponding parts. These parts are not described any further, unless it is necessary for the understanding of the invention. In this embodiment, the spaces 5a and 5b are divided into several parts by using separate partition walls 9 between the partition wall 4 and the envelope 1b in the space 5b and partition walls 10 forming a cross-like structure in the aeration space 5a. The partition walls 9 divide the outer space 5b into sequential segments and they extend from the bottom 1a of the receptacle 1 so high that a direct flow between the segments is prevented. The inlet channel 2 and the outlet channel 3 of the fiber mass suspension are situated close to each other and, between them, there is a separate partition wall 11, also extending from the bottom of the receptacle 1 so high that a fiber mass suspension from the inlet channel cannot flow directly into the outlet channel. Further, the partition walls 10 of the aeration space 5a are arranged in such a way that they are situated between the partition walls 9 of the outer space 5b and extend at their upper portion so high that a fiber mass suspension flow between the sectors formed in the aeration space $5a$ is prevented. The partition walls 10 in the aeration space $5a$ also extend preferably to the bottom of the receptacle, which intensifies the flow of the fiber mass suspension in a desired way. Simultaneously, the partition walls 10 divide the aeration space $5a$ into four sectors $5a_1$, to $5a_4$.

In this embodiment, when the suspension is introduced through the inlet channel 2, it rises up along with the air bubbles of the aeration space $5a$ and flows back over the partition wall 4 into the segment $5a_1$ on the inlet channel 2 side. Simultaneously, the froth leaves the surface of the receptacle 1 or is removed from there in a way similar to the FIGS. 1 and 2. The fiber mass suspension circulates further down, below the partition wall 4, and returns into the sector $5a_1$ of the aeration space $5a$, into which it had originally flowed from the inlet channel 2. Subsequently, spiral turns are provided around the partition wall 4 in a manner according to the flow rate of the fiber mass suspension such that, after one or several spiral turns, the suspension flows from the sector $5a_1$ of the aeration space $5a$ over the partition wall 4 into the segment $5b_2$ of the outer space. From there, the suspension turns back below the partition wall 4 into the sector $5a_1$, until it flows, after a sufficient number of turns, in the end portion of the segment $5b_2$ into the sector $5a_2$. In this manner, the fiber mass flow propagates spirally around the partition wall 4 from a segment into a sector and back from a sector into a segment, and moves simultaneously forward in the direction of the periphery of the partition wall 4, until it finally ends in the segment $5b_5$, which it then leaves through the outlet channel 3. In all sectors $5a_1$ to $5a_4$, the air bubbles cause an accumulation of impurities as a froth on the surface of the receptacle 1, from where the froth is then removed in each segment $5b_1$ to $5b_5$ in any manner described earlier. FIG. 4 shows schematically how the main flow of the fiber mass propagates spirally around the partition wall 4. For the sake of clarity, FIG. 4 shows by means of broken lines some partition walls remaining behind some other partition wall in the viewing direction.

Figure 5:
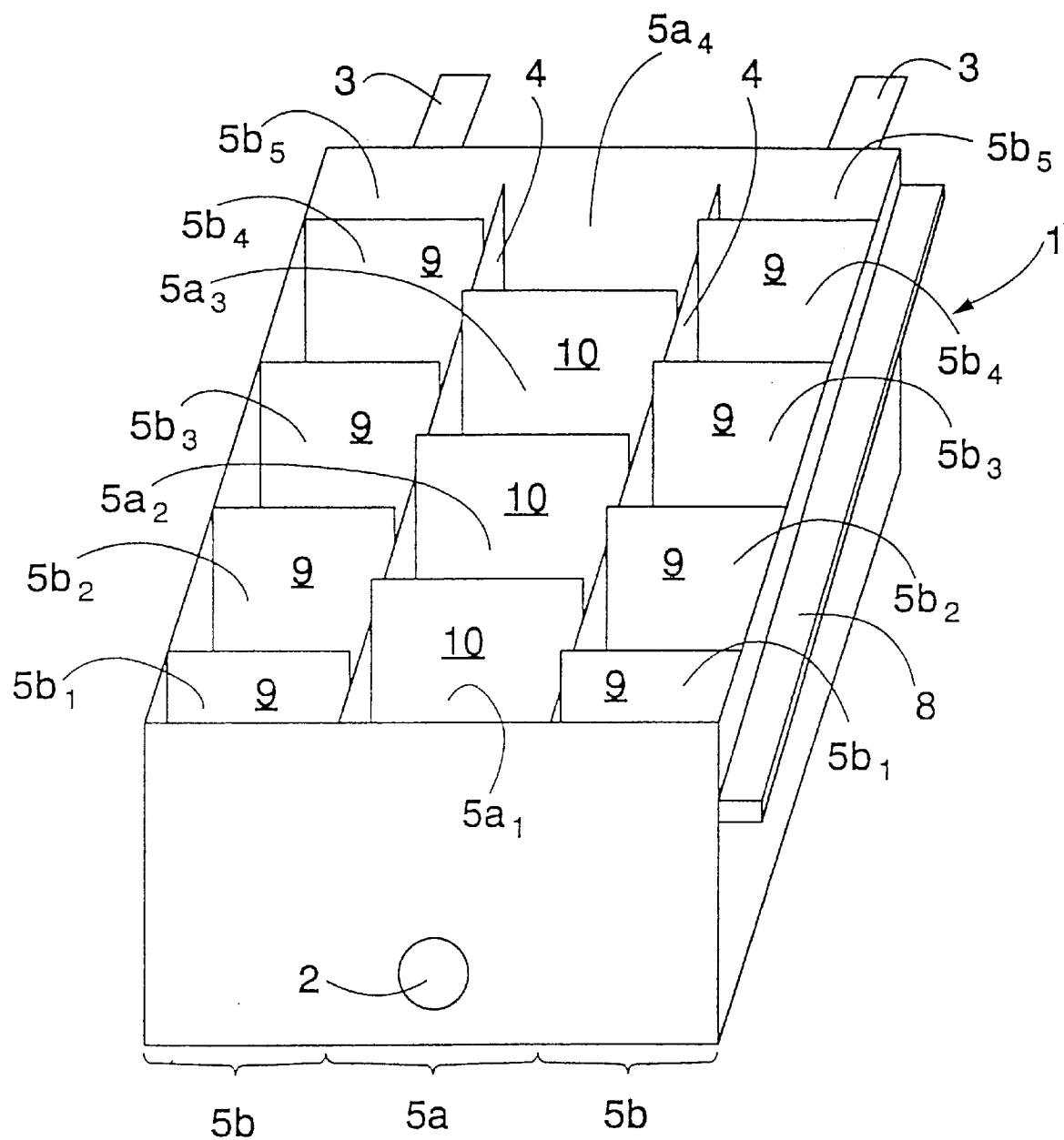
FIG. 5 shows schematically a third embodiment of the apparatus of the invention.

FIG. 5 shows schematically a third embodiment of the apparatus of the invention. FIG. 5 uses the same numerals as the FIGS. 1 to 4 for the corresponding parts, and therefore, these are not described in more detail, unless it is necessary for the understanding of the invention.

FIG. 5 shows schematically a rectangular receptacle 1. In this case, the interior of the receptacle 1 is divided in the longitudinal direction into three parallel spaces, i.e. an aeration space $5a$, and two spaces $5b$ in parallel with that. As in the earlier case, the partition walls are mounted and dimensioned such that there is a connection from the space $5a$ in the middle below the partition walls 4 to each space $5b$ on the sides. Also, the upper portion of the partition walls 4 is situated below the edges of the envelope $1b$ of the receptacle 1 such that the suspension may flow over the partition walls 4 from one space into the other. According to the solution of the FIGS. 3 and 4, in principle, the aeration space $5a$ in the middle is divided by the partition walls 10 into the parts $5a_1$ to $5a_4$ and, respectively, the spaces $5b$ on the sides are divided by the partition walls 9 into the sequential parts $5b_1$ to $5b_5$. The partition walls 9 extend from the bottom of the receptacle 1 right above the partition walls 4 preventing a direct suspension flow between the parts of the spaces. Correspondingly, the partition walls 10 in the aeration space $5a$ extend above the partition walls 4 preventing a direct flow between the parts $5a_1$ to $5a_4$ of the aeration space $5a$ and also extend preferably down to the bottom of the receptacle. The inlet channel 2 of the suspension is connected to the first part $5a_1$ of the aeration space $5a$ at the end of the receptacle, and respectively, the discharge of the fiber mass is implemented by connecting the outlet channels to the last parts $5b_5$ of the spaces $5b$. Further, there may be discharge chutes 8 on the sides of the receptacle 1 for collecting the froth that has flowed over the edges of the receptacle 1 and contains impurities.

In the solution of the figure, the air is fed from the bottom of all parts $5a_1$ to $5a_4$ of the aeration space $5a$, whereby the suspension coming from the inlet channel 2 flows upwards and is distributed into the first parts $5b_1$ of the spaces $5b$ on both sides of the receptacle 1. There, the suspension flows downwards at the same time as the froth accumulated on the surface flows over the side walls of the receptacle 1 and the suspension, which has flowed downwards, turns below the partition walls 4 back into the space $5a_1$. There, under the influence of aeration, it rises upwards again and moves simultaneously forward in the longitudinal direction of the receptacle 1. Two spiral flows are finally created, i.e. one flow around each partition wall 4, but in opposite directions, propagating from the parts of the space $5a$ to the parts of the spaces $5b$ and back again into the space $5a$. The apparatus of FIG. 5 could, of course, also be implemented by using only two spaces in the longitudinal direction of the receptacle 1, and respectively, the solution could also be implemented by using for instance several parallel spaces comprising, in turns, an aeration space $5a$ and spaces $5b$ on both sides thereof, respectively. The most preferable solution would then be a solution with an odd amount of spaces so that the outermost spaces would always be spaces $5b$ and the aeration space $5a$ would always be between them.

The invention has been described above in the specification and the drawings only by way of example, and it has in no way been restricted to that. According to the application, the upper ends of the partition wall may thus extend above or below the upper edge of the envelope or be at the same level with it. An advantageous feature is that the receptacle of the apparatus is divided into at least two separate spaces so that the suspension may flow from the lower portion and the upper portion of the partition wall between the spaces. Another advantageous feature is that only one of the two spaces in communication with each other is provided with an air feed required for cleaning so that the flow created by air bubbles makes the fiber mass suspension flow around the partition wall between the spaces, creating a froth containing impurities, which froth can be removed from the upper portion of the receptacle. The fiber mass being cleaned thus propagates with a spiral-like movement from the inlet channel to the outlet channel and becomes cleaner all the time.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. An apparatus for cleaning a fiber mass suspension, said apparatus comprising:

a receptacle for receiving the suspension to be cleaned;

an inlet channel for feeding the suspension into the receptacle;

an outlet channel for discharging the fiber suspension from the receptacle;

at least one traversable partition wall for dividing the receptacle into at least an aeration space and a separate nonaeration space, said traversable partition wall being formed in such a way that the spaces are in fluid communication with each other at lower and upper portions of the traversable partition wall so that the suspension may flow from one space into the other across the traversable partition wall;

an air feed supply for feeding air into the aeration space, said air feed supply causing air bubbles for separating impurities on the surface of the suspension and further causing a flow upwards in the aeration space, over the traversable partition wall and downwards in the nonaeration space on the other side of the traversable partition wall to thereby create a spiral flow around the partition wall between the two spaces;

at least one nontraversable partition wall in the aeration space for dividing the aeration space into separate parts, said nontraversable partition wall extending within the receptacle such that adjacent parts of the aeration space are not in fluid communication with each other; and, at least one nontraversable partition wall in the nonaeration space for dividing the other space into separate parts, said nontraversable partition wall extending within the receptacle such that adjacent parts of the nonaeration space are not in fluid communication with each other, said nontraversable partition walls of said aeration space and said nonaeration space being positioned in an offset arrangement so that each part of each space is in fluid communication with another part of the other space and the fiber mass suspension is thereby caused to flow from the inlet channel to the outlet channel by moving in turns from one part in one space to another part in the other space and the fiber mass is circulated and cleaned throughout the receptacle.

2. An apparatus according to claim 1 wherein the receptacle comprises an outer wall and the traversable partition wall further comprises a closed loop circumscribing the aeration space within the receptacle outer wall and defining the nonaeration space between the traversable partition wall and the receptacle outer wall.

3. An apparatus according to claim 2 wherein the inlet channel and the outlet channel are positioned on a same side of the receptacle and both communicate with the nonaeration space, and further wherein a nontraversable partition wall separates the inlet channel from the outlet channel so that the suspension flows from the inlet channel into the outlet channel by moving in turns from one part in one space to another part in the other space and thus around the receptacle until leaving the last part of the nonaeration space through the outlet channel.

4. An apparatus according to claim 1 wherein the inlet channel and the outlet channel are positioned on opposite sides of the receptacle and define an imaginary line between the channels, said at least one traversable partition wall being arranged such that the suspension flows between the channels on both sides of the line between the channels in two spiral flows.

5. An apparatus according to claim 1 wherein the receptacle comprises a pair of opposite ends and one of the inlet channel and the outlet channel is positioned at each end of the receptacle, said traversable partition wall extending from one end of the receptacle to the other end such that the fiber mass suspension flows from one end of the receptacle to the other end around the partition wall in a spiral-like manner.

6. An apparatus according to claim 5 wherein the receptacle comprises at least two outer walls extending between the opposite ends and at least two traversable partition walls extending between the opposite ends in a position between the outer walls, said walls defining an aeration space between the traversable partition walls and two nonaeration spaces between the traversable partition walls and the outer walls, said nonaeration spaces each being in communication with an outlet channel so that, when the fiber mass flows through the receptacle and air is fed into the aeration space, two spiral flows circulating in directions opposite to each other are created around the traversable partition walls and out through the respective outlet channels.

7. An apparatus according to claim 5 wherein said nontraversable partition walls are positioned to define sequential parts in a longitudinal direction from one end of the receptacle to the other and are arranged in an offset manner such that the nontraversable partition walls of the aeration space are not in alignment with the nontraversable partition walls of the nonaeration space.

* * * * *